(12) United States Patent
Scott et al.

(10) Patent No.: US 10,636,024 B2
(45) Date of Patent: Apr. 28, 2020

(54) SELF-SERVICE METHOD AND DEVICE

(71) Applicant: Shenzhen Malong Technologies Co., Ltd., Shenzhen (CN)

(72) Inventors: Matthew Robert Scott, Shenzhen (CN); Dinglong Huang, Shenzhen (CN); Kai Fu, Shenzhen (CN)

(73) Assignee: Shenzhen Malong Technologies Co., Ltd., Shenzhen (CN)

( * ) Notice: Subject to any disclaimer, the term of this patent is extended or adjusted under 35 U.S.C. 154(b) by 159 days.

(21) Appl. No.: 15/985,413

(22) Filed: May 21, 2018

(65) Prior Publication Data
US 2019/0164142 A1 May 30, 2019

(30) Foreign Application Priority Data
Nov. 27, 2017 (CN) .......................... 2017 1 1204094

(51) Int. Cl.
| | | |
|---|---|---|
| *G06Q 20/20* | (2012.01) | |
| *G07G 1/00* | (2006.01) | |
| *G06F 16/583* | (2019.01) | |
| *G06K 7/10* | (2006.01) | |
| *G06K 9/00* | (2006.01) | |

(52) U.S. Cl.
CPC ......... *G06Q 20/208* (2013.01); *G06F 16/583* (2019.01); *G06K 7/1092* (2013.01); *G06K 9/00671* (2013.01); *G07G 1/0036* (2013.01); *G07G 1/0072* (2013.01); *G07G 1/0081* (2013.01)

(58) Field of Classification Search
CPC .... G06Q 20/208; G06Q 30/06; G07G 1/0072; G07G 1/0036; G07G 1/0081; G06K 9/00671; G06K 7/1092; G06K 17/0022; G06F 16/583
See application file for complete search history.

(56) References Cited

U.S. PATENT DOCUMENTS

| | | | | |
|---|---|---|---|---|
| 3,741,345 A | * | 6/1973 | Saridis ..................... | A47F 10/00 186/55 |
| 5,497,314 A | * | 3/1996 | Novak ..................... | A47F 9/046 705/17 |
| 5,671,362 A | * | 9/1997 | Cowe ................... | G06Q 10/087 340/5.92 |
| 6,412,694 B1 | * | 7/2002 | Kumar ............... | G06K 7/10861 235/462.01 |

(Continued)

*Primary Examiner* — Ashford S Hayles
(74) *Attorney, Agent, or Firm* — Shook, Hardy & Bacon L.L.P.; Charlie Zhao

(57) ABSTRACT

Provided are a self-service method and device. The method includes: acquiring by a camera video data associated with a shopping cart at a distance from a shelf less than a preset value; determining whether an article is being placed into the shopping cart, based on identification of the video data; if yes, acquiring an ID of the shopping cart, determining the placed article and associating the ID with the article; displaying a total sum of all articles associated with the ID to the user when detecting the shopping cart corresponding to the ID is located in a preset payment area in the shopping mall; and executing a permitting procedure for allowing the shopping cart corresponding to the ID to pass upon reception of a message fed back from the payment area and indicating that the total sum corresponding to the ID has been cleared.

12 Claims, 2 Drawing Sheets

(56) References Cited

U.S. PATENT DOCUMENTS

| | | | | |
|---|---|---|---|---|
| 6,424,370 B1* | 7/2002 | Courtney | ........... | G06K 9/00342 348/143 |
| 6,909,356 B2* | 6/2005 | Brown | ........... | G08B 13/2462 340/5.2 |
| 6,915,135 B1* | 7/2005 | McKee | ........... | G01S 7/003 340/539.13 |
| 7,227,893 B1* | 6/2007 | Srinivasa | ........... | G06K 9/00771 348/155 |
| 7,522,057 B2* | 4/2009 | Stern | ........... | G08B 21/0415 340/522 |
| 7,780,081 B1* | 8/2010 | Liang | ........... | G06Q 30/0633 235/383 |
| 7,903,141 B1* | 3/2011 | Mariano | ........... | H04N 7/18 348/143 |
| 8,009,863 B1* | 8/2011 | Sharma | ........... | G06K 9/00335 348/159 |
| 8,264,422 B1* | 9/2012 | Persson | ........... | G06Q 10/087 345/7 |
| 8,325,036 B1* | 12/2012 | Fuhr | ........... | G06Q 10/087 340/5.92 |
| 8,538,820 B1* | 9/2013 | Migdal | ........... | H04N 7/18 348/153 |
| 8,577,705 B1* | 11/2013 | Baboo | ........... | G06Q 30/02 705/7.11 |
| 8,695,878 B2* | 4/2014 | Burnside | ........... | G06Q 10/087 235/385 |
| 8,810,392 B1* | 8/2014 | Teller | ........... | G08B 21/24 235/385 |
| 8,817,094 B1* | 8/2014 | Brown | ........... | H04N 7/188 348/143 |
| 8,908,903 B2* | 12/2014 | Deng | ........... | G06K 9/00691 382/100 |
| 9,020,264 B2* | 4/2015 | Maeda | ........... | G06F 16/5854 382/181 |
| 9,026,941 B1* | 5/2015 | Krueger | ........... | G06F 16/00 715/812 |
| 9,124,778 B1* | 9/2015 | Crabtree | ........... | H04N 7/18 |
| 9,396,490 B1* | 7/2016 | Marx | ........... | G06Q 30/0282 |
| 9,659,272 B2* | 5/2017 | Birch | ........... | G06Q 10/087 |
| 9,740,937 B2* | 8/2017 | Zhang | ........... | H04N 7/18 |
| 9,747,497 B1* | 8/2017 | Sharma | ........... | G06K 9/00771 |
| 9,813,607 B2* | 11/2017 | Kalevo | ........... | H04N 5/23212 |
| 9,911,290 B1* | 3/2018 | Zalewski | ........... | G06Q 20/12 |
| 9,916,561 B2* | 3/2018 | Marathe | ........... | G06Q 10/087 |
| 10,129,507 B2* | 11/2018 | Landers, Jr. | ........... | G06Q 20/201 |
| 10,262,294 B1* | 4/2019 | Hahn | ........... | H03K 17/962 |
| 10,304,053 B1* | 5/2019 | Templeton | ........... | G01B 7/14 |
| 10,339,493 B1* | 7/2019 | Famularo | ........... | G06Q 10/087 |
| 2002/0113123 A1* | 8/2002 | Otto | ........... | G06K 17/0022 235/381 |
| 2002/0170961 A1* | 11/2002 | Dickson | ........... | G06K 7/0008 235/383 |
| 2003/0015585 A1* | 1/2003 | Wike, Jr. | ........... | G07F 7/02 235/383 |
| 2003/0216969 A1* | 11/2003 | Bauer | ........... | G06K 7/0008 705/22 |
| 2004/0103034 A1* | 5/2004 | Reade | ........... | G06Q 20/20 705/16 |
| 2004/0168172 A1* | 8/2004 | Masuda | ........... | G06Q 10/10 719/310 |
| 2005/0073585 A1* | 4/2005 | Ettinger | ........... | H04N 7/18 348/155 |
| 2005/0105765 A1* | 5/2005 | Han | ........... | G06K 9/00295 382/100 |
| 2005/0131578 A1* | 6/2005 | Weaver | ........... | G01G 19/4144 700/244 |
| 2005/0185823 A1* | 8/2005 | Brown | ........... | G08B 13/19604 382/103 |
| 2005/0189412 A1* | 9/2005 | Hudnut | ........... | G07G 3/003 235/383 |
| 2005/0200476 A1* | 9/2005 | Forr | ........... | G07C 9/28 340/539.13 |
| 2006/0032915 A1* | 2/2006 | Schwartz | ........... | G07F 7/02 235/383 |
| 2006/0251339 A1* | 11/2006 | Gokturk | ........... | G06K 9/00375 382/305 |
| 2006/0256082 A1* | 11/2006 | Cho | ........... | G06F 1/1626 345/156 |
| 2007/0143188 A1* | 6/2007 | Kelley | ........... | G06Q 30/0601 705/26.1 |
| 2007/0179921 A1* | 8/2007 | Zitnick | ........... | G06K 9/6211 706/20 |
| 2007/0182818 A1* | 8/2007 | Buehler | ........... | G08B 13/19602 348/143 |
| 2008/0011836 A1* | 1/2008 | Adema | ........... | G06Q 10/00 235/383 |
| 2008/0018738 A1* | 1/2008 | Lipton | ........... | G06K 9/00771 348/143 |
| 2008/0055194 A1* | 3/2008 | Baudino | ........... | G06F 3/011 345/8 |
| 2008/0059570 A1* | 3/2008 | Bill | ........... | G06Q 10/10 709/203 |
| 2008/0100704 A1* | 5/2008 | Venetianer | ........... | G06K 9/00771 348/143 |
| 2008/0130948 A1* | 6/2008 | Ozer | ........... | G06K 9/00228 382/103 |
| 2008/0130951 A1* | 6/2008 | Wren | ........... | H04N 7/18 382/103 |
| 2008/0159634 A1* | 7/2008 | Sharma | ........... | G06K 9/00771 382/224 |
| 2008/0193010 A1* | 8/2008 | Eaton | ........... | G06K 9/00771 382/159 |
| 2008/0198231 A1* | 8/2008 | Ozdemir | ........... | G08B 13/19608 348/159 |
| 2008/0221943 A1* | 9/2008 | Porter | ........... | G06Q 10/063 705/7.11 |
| 2008/0226129 A1* | 9/2008 | Kundu | ........... | A47F 9/045 382/103 |
| 2008/0230603 A1* | 9/2008 | Stawar | ........... | B62B 3/1408 235/383 |
| 2008/0260212 A1* | 10/2008 | Moskal | ........... | A61B 5/1079 382/118 |
| 2008/0303901 A1* | 12/2008 | Variyath | ........... | G01S 5/02 348/143 |
| 2008/0308630 A1* | 12/2008 | Bhogal | ........... | G06Q 30/02 235/383 |
| 2009/0039165 A1* | 2/2009 | Collins, Jr. | ........... | A47F 9/046 235/462.41 |
| 2009/0055278 A1* | 2/2009 | Nemani | ........... | G06Q 20/204 705/17 |
| 2009/0059270 A1* | 3/2009 | Opalach | ........... | G06K 9/00 358/1.15 |
| 2009/0083122 A1* | 3/2009 | Angell | ........... | G06Q 10/0631 705/7.33 |
| 2009/0101713 A1* | 4/2009 | Ulrich | ........... | G06K 7/10346 235/383 |
| 2009/0121017 A1* | 5/2009 | Cato | ........... | G06Q 10/087 235/385 |
| 2009/0125406 A1* | 5/2009 | Lewis | ........... | G06Q 20/208 705/23 |
| 2009/0140046 A1* | 6/2009 | Landers, Jr. | ........... | G06Q 10/087 235/385 |
| 2009/0145965 A1* | 6/2009 | Davis | ........... | G06Q 30/0603 235/383 |
| 2009/0228363 A1* | 9/2009 | Segev | ........... | A47F 9/047 705/16 |
| 2009/0232366 A1* | 9/2009 | Okochi | ........... | G06Q 10/10 382/119 |
| 2009/0259571 A1* | 10/2009 | Ebling | ........... | G06Q 50/30 705/28 |
| 2009/0302106 A1* | 12/2009 | Satou | ........... | G06Q 20/203 235/383 |
| 2010/0013931 A1* | 1/2010 | Golan | ........... | G06K 9/00771 348/150 |
| 2010/0019905 A1* | 1/2010 | Boddie | ........... | G06Q 10/087 340/572.1 |
| 2010/0026802 A1* | 2/2010 | Titus | ........... | G08B 13/19608 348/143 |

(56) References Cited

U.S. PATENT DOCUMENTS

| | | | | |
|---|---|---|---|---|
| 2010/0060455 A1* | 3/2010 | Frabasile | G06Q 10/087 | 340/572.4 |
| 2010/0082301 A1* | 4/2010 | Skibiski | H04L 41/0618 | 702/188 |
| 2010/0117959 A1* | 5/2010 | Hong | G06F 1/1626 | 345/158 |
| 2010/0138037 A1* | 6/2010 | Adelberg | G06Q 10/087 | 700/241 |
| 2010/0141386 A1* | 6/2010 | Kim | H01Q 1/2216 | 340/10.1 |
| 2010/0250305 A1* | 9/2010 | Lee | G06Q 10/06316 | 705/7.26 |
| 2010/0277277 A1* | 11/2010 | Green | G07C 9/28 | 340/5.72 |
| 2010/0318440 A1* | 12/2010 | Coveley | G01G 19/40 | 705/26.1 |
| 2011/0102588 A1* | 5/2011 | Trundle | G08B 13/196 | 348/143 |
| 2011/0115914 A1* | 5/2011 | Bailey | G06Q 10/00 | 348/150 |
| 2011/0140380 A1* | 6/2011 | Ulrich | B62B 5/0096 | 280/33.992 |
| 2011/0228984 A1* | 9/2011 | Papke | G06K 9/00771 | 382/103 |
| 2011/0234840 A1* | 9/2011 | Klefenz | G06K 9/00375 | 348/222.1 |
| 2011/0242025 A1* | 10/2011 | Wen | G06F 3/04883 | 345/173 |
| 2011/0280547 A1* | 11/2011 | Fan | G08B 13/196 | 386/239 |
| 2011/0295644 A1* | 12/2011 | Hara | G06Q 10/06315 | 705/7.25 |
| 2011/0320322 A1* | 12/2011 | Roslak | G06Q 10/087 | 705/28 |
| 2012/0080517 A1* | 4/2012 | Braunstein | G06Q 10/087 | 235/379 |
| 2012/0226556 A1* | 9/2012 | Itagaki | G07G 1/0081 | 705/14.64 |
| 2012/0284132 A1* | 11/2012 | Kim | G07G 1/0081 | 705/20 |
| 2012/0310727 A1* | 12/2012 | Bradley | G06Q 30/02 | 705/14.41 |
| 2012/0310757 A1* | 12/2012 | Kim | G06Q 20/20 | 705/17 |
| 2013/0046644 A1* | 2/2013 | Sano | G06O 20/20 | 705/18 |
| 2013/0076898 A1* | 3/2013 | Philippe | H04N 7/18 | 348/143 |
| 2013/0077820 A1* | 3/2013 | Marais | G06K 9/00335 | 382/103 |
| 2013/0110565 A1* | 5/2013 | Means, Jr. | G06Q 10/06 | 705/7.11 |
| 2013/0154804 A1* | 6/2013 | Jung | G06K 7/10356 | 340/10.1 |
| 2013/0182904 A1* | 7/2013 | Zhang | H04N 7/18 | 382/103 |
| 2013/0197968 A1* | 8/2013 | Davis | H04L 67/306 | 705/7.29 |
| 2013/0208115 A1* | 8/2013 | Park | H04N 7/18 | 348/143 |
| 2013/0216094 A1* | 8/2013 | DeLean | G06K 9/00335 | 382/103 |
| 2013/0223673 A1* | 8/2013 | Davis | G06K 9/78 | 382/100 |
| 2013/0250115 A1* | 9/2013 | Fan | G06K 9/00771 | 348/150 |
| 2013/0265232 A1* | 10/2013 | Yun | G06F 3/04815 | 345/158 |
| 2013/0290106 A1* | 10/2013 | Bradley | G06Q 90/20 | 705/14.64 |
| 2013/0320085 A1* | 12/2013 | Chen | G06Q 30/02 | 235/385 |
| 2013/0322686 A1* | 12/2013 | Kritt | G06K 9/62 | 382/103 |
| 2013/0342316 A1* | 12/2013 | Ghaffari | H04Q 9/00 | 340/10.1 |
| 2014/0001258 A1* | 1/2014 | Chan | G06Q 10/0875 | 235/385 |
| 2014/0052555 A1* | 2/2014 | MacIntosh | G07G 1/0036 | 705/23 |
| 2014/0164176 A1* | 6/2014 | Kitlyar | G06Q 30/0633 | 705/26.8 |
| 2014/0201039 A1* | 7/2014 | Harwell | G06Q 30/0643 | 705/27.2 |
| 2014/0222501 A1* | 8/2014 | Hirakawa | G06Q 30/0201 | 705/7.29 |
| 2014/0240088 A1* | 8/2014 | Robinette | G06K 19/0705 | 340/5.61 |
| 2014/0293032 A1* | 10/2014 | Gontina | G06K 9/00771 | 348/77 |
| 2014/0304123 A1* | 10/2014 | Schwartz | G06Q 10/087 | 705/28 |
| 2014/0351098 A1* | 11/2014 | Shafer | G06Q 10/087 | 705/28 |
| 2014/0365334 A1* | 12/2014 | Hurewitz | G06Q 30/0613 | 705/26.41 |
| 2014/0365336 A1* | 12/2014 | Hurewitz | G06Q 30/0643 | 705/26.62 |
| 2014/0379296 A1* | 12/2014 | Nathan | G06Q 10/08 | 702/150 |
| 2015/0006319 A1* | 1/2015 | Thomas | G06Q 30/0633 | 705/26.8 |
| 2015/0012426 A1* | 1/2015 | Purves | G06Q 30/0623 | 705/41 |
| 2015/0019391 A1* | 1/2015 | Kumar | G07G 1/0036 | 705/28 |
| 2015/0029339 A1* | 1/2015 | Kobres | H04N 7/181 | 348/150 |
| 2015/0039458 A1* | 2/2015 | Reid | G06K 9/00335 | 705/26.1 |
| 2015/0088703 A1* | 3/2015 | Yan | G06F 3/147 | 705/28 |
| 2015/0117703 A1* | 4/2015 | Peng | G06T 11/60 | 382/103 |
| 2015/0199698 A1* | 7/2015 | Yoshitake | G06Q 30/0205 | 705/7.34 |
| 2015/0206188 A1* | 7/2015 | Tanigawa | G06Q 30/0261 | 705/14.58 |
| 2015/0206335 A1* | 7/2015 | Hugel | G06T 13/20 | 345/419 |
| 2015/0235161 A1* | 8/2015 | Azar | G06Q 10/063114 | 705/7.15 |
| 2015/0269549 A1* | 9/2015 | Herring | G06Q 20/203 | 705/18 |
| 2015/0310447 A1* | 10/2015 | Shaw | G06Q 30/016 | 705/304 |
| 2015/0348060 A1* | 12/2015 | Ogawa | G06Q 30/02 | 705/7.29 |
| 2016/0055555 A1* | 2/2016 | Mills | G06Q 30/0609 | 705/26.35 |
| 2016/0071052 A1* | 3/2016 | Henry | G06Q 10/087 | 235/380 |
| 2016/0110703 A1* | 4/2016 | Herring | G06K 9/00221 | 705/23 |
| 2016/0125265 A1* | 5/2016 | Xie | G06F 16/50 | 382/209 |
| 2016/0180670 A1* | 6/2016 | Swope | G08B 13/246 | 340/568.5 |
| 2016/0189277 A1* | 6/2016 | Davis | G06Q 30/0633 | 705/26.8 |
| 2016/0203499 A1* | 7/2016 | Yamashita | G06Q 30/02 | 705/7.29 |
| 2016/0224857 A1* | 8/2016 | Zhang | G06K 9/00771 | |
| 2016/0335667 A1* | 11/2016 | Aubrey | G06Q 30/0269 | |
| 2017/0083887 A1* | 3/2017 | Volta | G06Q 30/0635 | |
| 2017/0186072 A1* | 6/2017 | Clark | G06Q 30/0633 | |
| 2017/0344832 A1* | 11/2017 | Leung | G06T 7/292 | |
| 2018/0075427 A1* | 3/2018 | Greenberger | G06Q 20/202 | |

(56) References Cited

U.S. PATENT DOCUMENTS

| | | | |
|---|---|---|---|
| 2018/0096566 A1* | 4/2018 | Blair, II | G06Q 20/4014 |
| 2018/0253604 A1* | 9/2018 | Hiramatsu | G06K 9/00771 |
| 2018/0260868 A1* | 9/2018 | Peterson | G06Q 30/0619 |
| 2018/0260877 A1* | 9/2018 | Li | G07G 1/0045 |

* cited by examiner

SELF-SERVICE METHOD AND DEVICE

Cross Reference to Related Applications

This application claims priority under 35 U.S.C. § 119 to Chinese patent application 201711204094.4, filed with the State Intellectual Property Office on Nov. 27, 2017, the disclosure of which is incorporated herein by reference.

TECHNICAL FIELD

The present invention relates to the field of self-service, and particularly to a self-service method and device.

BACKGROUND ART

Self-service methods have been developed as the identification technology for products progresses. However, current self-services involve excessive complicated operations and require great investment, which results in a limited range of application and a failure to apply to general areas which require self-service.

DISCLOSURE OF THE INVENTION

Directed at the defects present in the prior art, embodiments of the present invention provide a self-service method and device which are simple and easy to implement, widely applicable, less resource-consuming and applicable to areas such as a shopping mall.

Specifically, the present invention provides the following specific embodiments.

An embodiment of the present invention provides a self-service method applicable to a shopping mall provided with a plurality of shelves and a plurality of shopping carts. Specifically, each of the shelves is provided with a camera. The shopping carts are respectively pre-provided with different electronic tags. The different electronic tags correspond to different IDs. The method includes:
  acquiring, by the camera of each of the shelves, video data associated with the shopping cart at a distance from the shelf less than a preset value;
  determining, based on identification of the video data, whether an article is being placed into the shopping cart;
  acquiring, if it is determined that an article is being placed into the shopping cart, the ID of the shopping cart, determining the placed article, and associating the ID with the article;
  displaying to a user a total sum of all the articles associated with the ID, when detecting the shopping cart corresponding to the ID is located in a preset payment area of the shopping mall; and
  executing a permitting procedure for allowing the shopping cart corresponding to the ID to pass, upon reception of a message fed back from the payment area and indicating that the total sum corresponding to the ID has been cleared.

In a specific embodiment, each of the shelves is further provided with an electronic tag reader. The electronic tag reader is configured to acquire the ID contained in the electronic tag of the shopping cart which is away from the shelf at a distance less than a certain value.

The step of acquiring the ID of the shopping cart, determining the placed article, and associating the ID with the article includes:

acquiring the ID of the shopping cart by the electronic tag reader, and identifying a picture of article captured by the camera so as to determine the placed article.

In a specific embodiment, each of the shelves corresponds to a certain type of article within a preset period of time.

The step of identifying a picture of article captured by the camera so as to determine the placed article includes:
  shooting the article by the camera to capture a picture of article; and
  performing a first matching procedure, in which the captured picture of article is matched with each of pre-stored pictures of the article on the shelf, so as to determine an article corresponding to the captured picture of article.

In a specific embodiment, if the article corresponding to the captured picture of article cannot be determined through the first matching procedure, a second matching procedure is performed, in which the captured picture of article is matched with pre-stored pictures of all articles in the shopping mall, so as to determine the article corresponding to the picture of article.

In a specific embodiment, the method further includes:
  generating a prompt message if the acquisition of the ID of the shopping cart or the determination of the placed article fails; where the prompt message is configured to prompt the user to make payment face to face.

An embodiment of the present invention further provides a self-service device applicable to a shopping mall provided with a plurality of shelves and a plurality of shopping carts. Specifically, each of the shelves is provided with a camera. The shopping carts are respectively pre-provided with different electronic tags. The different electronic tags correspond to different IDs. The device includes:
  an acquiring module configured to acquire, by the camera of each of the shelves, video data associated with the shopping cart which is away from the shelf at a distance less than a preset value;
  a determining module configured to determine, based on identification of the video data, whether an article is being placed into the shopping cart;
  an associating module configured to acquire the ID of the shopping cart, determine the placed article, and associating the ID with the article, if it is determined that an article is being placed into the shopping cart;
  a displaying module configured to display to a user a total sum of all articles associated with the ID, when detecting the shopping cart corresponding to the ID is located in a preset payment area of the shopping mall; and
  an executing module configured to execute a permitting procedure for allowing the shopping cart corresponding to the ID to pass, upon reception of a message fed back from the payment area and indicating that the total sum corresponding to the ID has been cleared.

In a specific embodiment, the shelf is further provided with an electronic tag reader. The electronic tag reader is configured to acquire the ID contained in the electronic tag of the shopping cart which is away from the shelf at a distance less than a certain value.

The associating module is configured to:
  acquire the ID of the shopping cart by the electronic tag reader, and identify a picture of article captured by the camera so as to determine the placed article.

In a specific embodiment, each of the shelves corresponds to a certain type of article within a preset period of time.

The identifying a picture of article captured by the camera so as to determine the placed article, performed by the associating module, includes:

shooting the article by the camera to capture a picture of article; and performing a first matching procedure, in which the captured picture of article is matched with each of pre-stored pictures of the articles on the shelves, so as to determine an article corresponding to the captured picture of article.

In a specific embodiment, the device further includes a processing module configured to perform a second matching procedure, in which the captured picture of article is matched with pre-stored pictures of all articles in the shopping mall, so as to determine the article corresponding to the picture of article, if the article corresponding to the captured picture of article cannot be determined through the first matching procedure.

In a specific embodiment, the device further includes:

a prompting module configured to generate a prompt message if the acquisition of the ID of the shopping cart or the determination of the placed article; where the prompt message is configured to prompt the user to make payment face to face.

Thus, the embodiments of the present invention provide a self-service method and device applicable to a shopping mall provided with a plurality of shelves and a plurality of shopping carts. Specifically, each of the shelves is provided with a camera. The shopping carts are respectively pre-provided with different electronic tags. The different electronic tags correspond to different IDs. The method includes: acquiring, by the camera of each of the shelves, video data associated with the shopping cart at a distance from the shelf less than a preset value; determining, based on identification of the video data, whether an article is being placed into the shopping cart; if it is determined that an article is being placed into the shopping cart, acquiring the ID of the shopping cart, determining the placed article and associating the ID with the article; displaying to a user a total sum of all articles associated with the ID, when detecting the shopping cart corresponding to the ID is located in a preset payment area of the shopping mall; and executing a permitting procedure for allowing the shopping cart corresponding to the ID to pass, upon reception of a message fed back from the payment area and indicating that the total sum corresponding to the ID has been cleared. Self-service shopping, realized by providing such cameras and electronic tags, is simple and easy to implement, widely applicable, less resource-consuming and thus can be applied to areas such as a relatively big shopping mall.

BRIEF DESCRIPTION OF DRAWINGS

In order to more clearly illustrate the technical solutions of the embodiments of the present invention, drawings necessary for the embodiments will be briefly described below. It should be understood that the following drawings merely show some embodiments of the present invention and thus should not be construed as limiting the scope. Other related drawings can be obtained by those ordinarily skilled in the art according to these drawings without any creative effort.

DETAILED DESCRIPTION OF EMBODIMENTS

Figure 1:
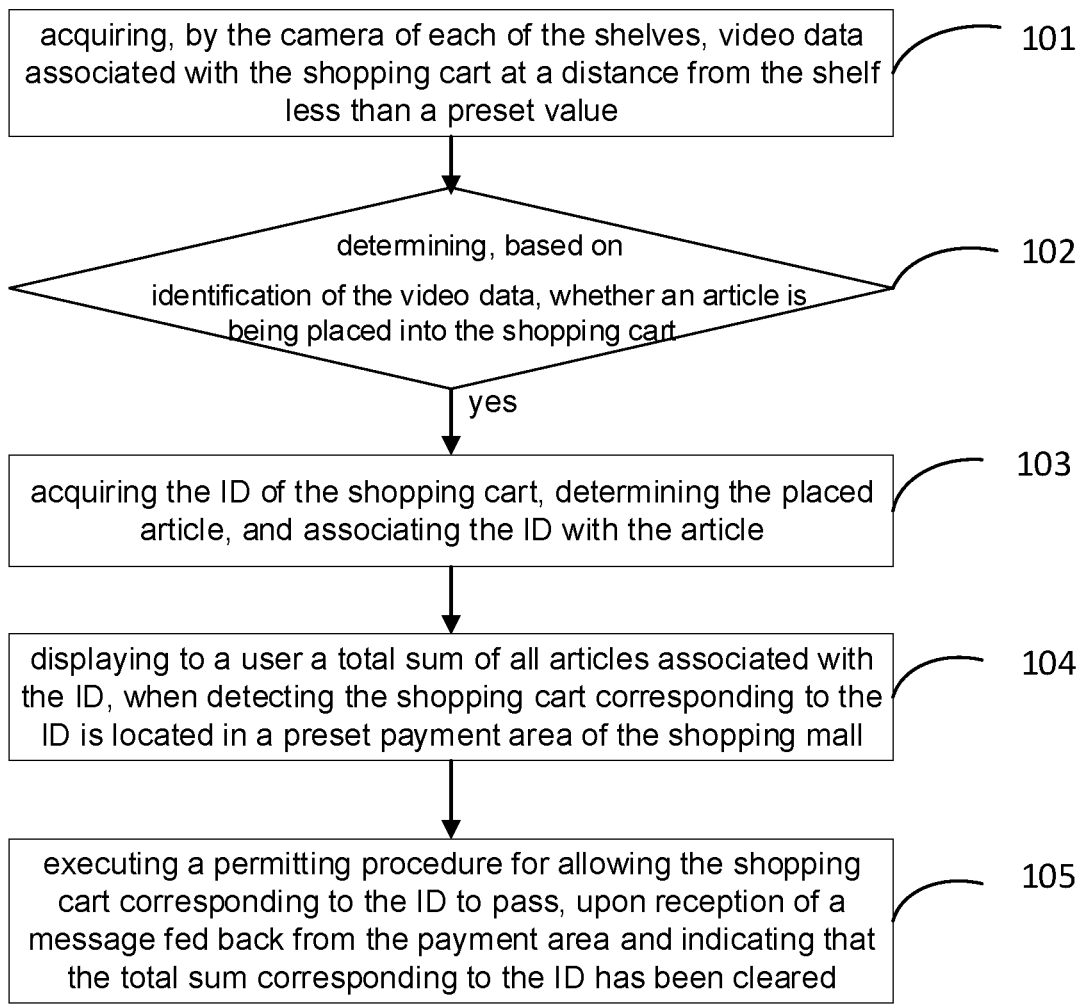
FIG. 1 is a schematic flow chart of a self-service method provided by an embodiment of the present invention.

Hereinafter, various embodiments of the present disclosure will be described more comprehensively. The present disclosure may have various embodiments, and adjustments and modifications may be made thereto. However, it should be understood that various embodiments of the present disclosure are not indented to be limited to the particular embodiments disclosed herein, and therefore the present disclosure should be considered as encompassing all adjustments, equivalents and/or alternatives that fall within the spirit and scope of the various embodiments of the present disclosure.

Hereinafter, terms such as "include" or "may include" used in the various embodiments of the present disclosure indicate the presence of the disclosed functions, operations or elements, and do not restrict from adding one or more functions, operations or elements. In addition, as used in the various embodiments of the present disclosure, terms such as "include", "have" and the derivative versions thereof only intend to indicate particular features, numbers, steps, operations, elements, components or combinations thereof, but should not be construed as excluding the possibility that one or more other features, numbers, steps, operations, elements, components or the combinations thereof may be present, or that one or more features, numbers, steps, operations, elements, components or the combinations thereof may be added.

In the various embodiments of the present disclosure, the expression "or" or "at least one of A and/or B" includes any or all combinations of the listed items. For example, the expression "A or B" or "at least one of A and/or B" may include A, may include B or may include both A and B.

The expressions (such as "first" and "second") used in the various embodiments of the present disclosure may embellish various constituent elements of the various embodiments, but not limit the corresponding constituent elements. For example, the above expressions do not limit the sequence and/or importance of the elements. Such expressions are used only for the purpose of distinguishing one element from other elements. For example, a first user device and a second user device represent different user devices, though both are user devices. For example, a first element may be referred to as a second element, and similarly, a second element may be referred to as a first element, without departing from the scope of the various embodiments of the present disclosure.

It should be noted that, if a constituent element is described to be "connected" to another constituent element, it means that a first constituent element may be directly connected to a second constituent element, and a third constituent element may be connected between the first constituent element and the second constituent element. On the contrary, if a constituent element is "directly connected" to another constituent element, it may be interpreted that there is no third constituent element existing between the first constituent element and the second constituent element.

The term "user" used in the various embodiments of the present disclosure may indicate a person who uses an electronic device or a device which uses an electronic device (e.g. an artificial intelligent electronic device).

The terms used in the various embodiments of the present disclosure are used only for the purpose of describing the particular embodiments, rather than limiting the various embodiments of the present disclosure. As used herein, the singular forms intend to include plural referents unless the context clearly dictates otherwise. Unless otherwise specified, all terms (including technical terms and scientific terms) used herein have the same meaning as that commonly understood by one ordinary skilled in the art of the various embodiments of the present disclosure. The terms (such as those terms defined in a commonly used dictionary) are to be interpreted as having the same meaning as those used in the context of related technical fields, instead of being interpreted as having an ideal meaning or an excessive formal meaning, unless otherwise clearly defined in the various embodiments of the present disclosure.

First Embodiment

The first embodiment of the present invention discloses a self-service method applicable to a shopping mall provided with a plurality of shelves and a plurality of shopping carts. Specifically, each of the shelves is provided with a camera. The shopping carts are respectively pre-provided with different electronic tags. Different electronic tags correspond to different IDs (Identifications). As shown in FIG. 1, the method includes the following steps.

In step 101, video data associated with the shopping cart is acquired, by the camera, the shopping cart being at a distance from the shelf less than a preset value.

Specifically, the camera provided on the shelf is configured to monitor the surroundings around the shelf over a preset range. The specific preset range may be set according to experience, and may be specifically determined according to a distance between a shelf and a spot where a user fetches an article from the shelf under normal circumstances. It can be well determined from the acquired video data whether an article is being transferred between the shelf and the shopping cart.

In step 102, it is determined whether an article is being placed into the shopping cart, based on identification of the video data.

Specifically, each of the pictures contained in the video data is identified to determine a trajectory of the article and the position of the shopping cart, so as to determine whether an article is being placed into the shopping cart.

In step 103, the ID of the shopping cart is acquired, the placed article is determined and the ID is associated with the article, if it is determined that an article is being placed into the shopping cart.

Specifically, if it is determined that an article is being placed into the shopping cart, the ID of the shopping cart is acquired, the placed article is determined and then the ID and the article will be associated with each other.

Specifically, in a specific embodiment, each of the shelves is further provided with an electronic tag reader. The electronic tag reader is configured to acquire the ID contained in the electronic tag of the shopping cart which is away from the shelf at a distance less than a certain value.

The step of acquiring the ID of the shopping cart, determining the placed article and associating the ID with the article includes:
    acquiring the ID of the shopping cart by the electronic tag reader, and identifying a picture of article captured by the camera so as to determine the placed article.
    Specifically, each of the shopping carts is pre-provided with an electronic tag, and each of the shelves is provided with the electronic tag reader which acquires the ID of the shopping cart by reading the electronic tag. To avoid other electronic tags from being read, it is possible to set that only the electronic tag on a shopping cart which is away from the shelf at a distance less than a certain value can be read. Specifically, the distance may be set according to the distance between the shopping cart and a shelf when a user is fetching an article from the shelf under normal circumstances.

An article may be identified based on an article picture that is taken. In an embodiment, for example, pictures of all articles in the shopping mall are captured in advance; specifically, the pictures may be taken from various angles, so as to form a picture library of articles. Subsequently, the article can be determined by matching the picture of article with the pictures in the picture library.

In another specific embodiment, each of the shelves corresponds to a certain type of article within a preset period of time.

The step of identifying a picture of article captured by the camera so as to determine the placed article includes:
    shooting the article by the camera to capture a picture of article; and
    performing a first matching procedure, in which the captured picture of article is matched with each of pre-stored pictures of the articles on the shelf, so as to determine an article corresponding to the captured picture of article.

In another embodiment, if the article corresponding to the captured picture of article cannot be determined through the first matching procedure, a second matching procedure is performed, in which the captured picture of article is matched with pre-stored pictures of all articles in the shopping mall, so as to determine the article corresponding to the picture of article.

Specifically, there are numerous pictures of articles of the entire shopping mall, specific articles are stored on certain shelves and normally fetched therefrom, and each of the shelves corresponds to a certain type of article within a certain period of time. Accordingly, in identifying the article, it is preferable to perform a matching procedure, in which the article picture is matched with the pictures of the articles stored on the shelf where the article is located, and only when the previous match fails, a matching procedure in which the article picture is matched with the pictures of all articles in the shopping mall will be performed. In this way, the efficiency is improved.

In step 104, displaying to a user a total sum of all articles associated with the ID when detecting the shopping cart corresponding to the ID is located in a preset payment area of the shopping mall.

Specifically, there are preset payment areas in the shopping mall. The ID of the shopping cart and all articles associated with the ID may be acquired when the shopping cart is in the payment area. The total sum of all articles will be displayed to the user to facilitate the payment. Specifically, the ID may also be acquired by an electronic tag reader provided in the payment area which may read IDs.

In step 105, a permitting procedure for allowing the shopping cart corresponding to the ID to pass is executed, upon reception of a message fed back from the payment area and indicating that the total sum corresponding to the ID has been cleared.

In a specific embodiment, the method further includes:
    generating a prompt message if the acquisition of the ID of the shopping cart or the determination of the placed article fails; where the prompt message is configured to inform the user to make payment face to face.

In a specific embodiment, it is contemplated that abnormal conditions e.g. power failure may be occur, which makes it impossible to acquire the ID of the shopping cart, or to determine the placed articles. In such cases, the users may be informed to make the payment face to face by a prompt.

Second Embodiment

Figure 2:
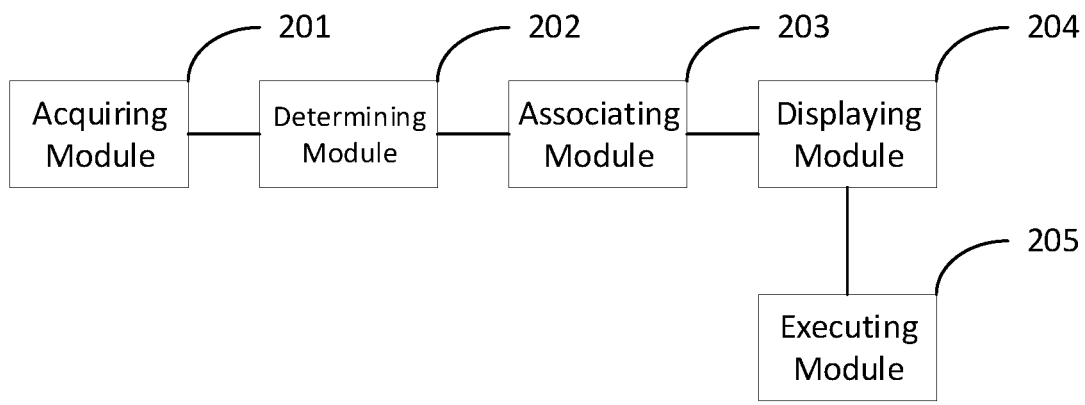
FIG. 2 is a schematic diagram of the structure of a self-service device provided by an embodiment of the present invention.

The second embodiment of the present invention further provides a self-service device applicable to a shopping mall provided with a plurality of shelves and a plurality of shopping carts. Specifically, each of the shelves is provided with a camera. The shopping carts are respectively pre-provided with different electronic tags. Different electronic tags correspond to different IDs. As shown in FIG. 2, the device includes:
  an acquiring module 201 configured to acquire, by the camera of each of the shelves, video data associated with the shopping cart which is away from the shelf at a distance less than a preset value;
  a determining module 202 configured to determine, based on identification of the video data, whether an article is being placed into the shopping cart;
  an associating module 203 configured to acquire the ID of the shopping cart, determine the placed article and associating the ID with the article, if it is determined that an article is being placed into the shopping cart;
  a displaying module 204 configured to display to a user a total sum of all articles associated with the ID, when detecting the shopping cart corresponding to the ID is located in a preset payment area of the shopping mall; and
  an executing module 205 configured to execute a permitting procedure for allowing the shopping cart corresponding to the ID to pass, upon reception of a message fed back from the payment area and indicating that the total sum corresponding to the ID has been cleared.

In a specific embodiment, each of the shelves is further provided with an electronic tag reader. The electronic tag reader is configured to acquire the ID contained in the electronic tag of the shopping cart which is away from the shelf at a distance less than a certain value.

The associating module 203 is configured to:
acquire the ID of the shopping cart by the electronic tag reader, and identify a picture captured by the camera so as to determine the placed article.

In a specific embodiment, each of the shelves corresponds to a certain type of article within a preset period of time.

The identifying a picture of article captured by the camera so as to determine the placed article, performed by the associating module 203, includes:
  shooting the article by the camera to capture a picture of article; and
  performing a first matching procedure, in which the captured picture of article is matched with each of pre-stored pictures of the article on the shelf, so as to determine an article corresponding to the captured picture of article.

Figure 3:
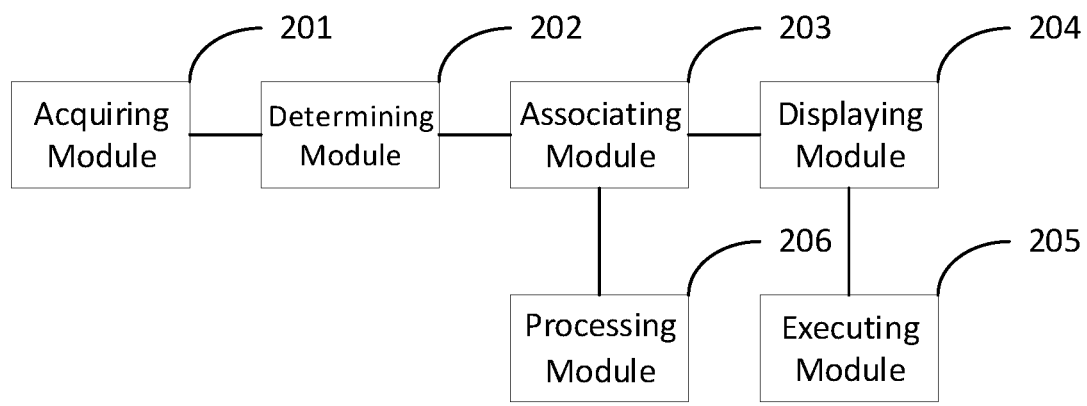
FIG. 3 is a schematic diagram of the structure of a self-service device provided by an embodiment of the present invention.

In a specific embodiment, as shown in FIG. 3, the device further includes:
  a processing module 206 configured to perform a second matching procedure, in which the captured picture of article is matched with pre-stored pictures of all articles in the shopping mall, so as to determine the article corresponding to the picture of article, if the article corresponding to the captured picture of article cannot be determined through the first matching procedure.

Figure 4:
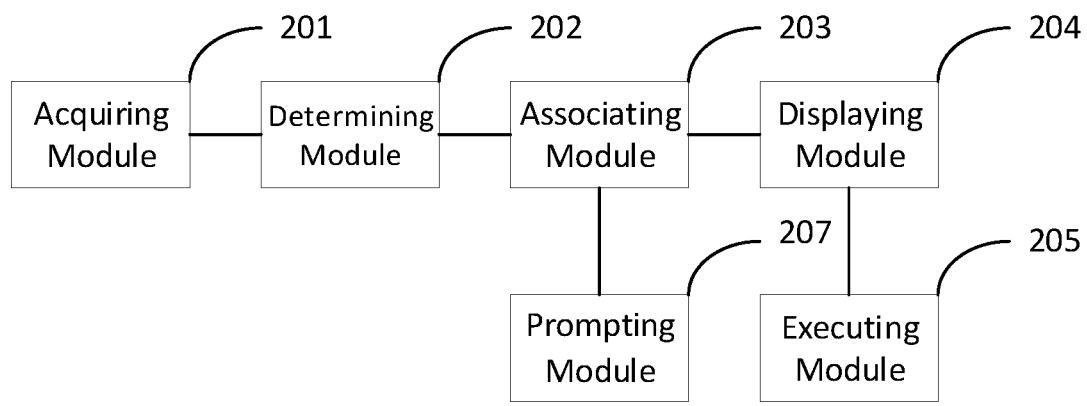
FIG. 4 is a schematic diagram of the structure of a self-service device provided by an embodiment of the present invention.

In a specific embodiment, as shown in FIG. 4, the device further includes:
  a prompting module 207 configured to generate a prompt message if the acquisition of the ID of the shopping cart or the determination of the placed article fails; where the prompt message is configured to prompt the user to make payment face to face.

Thus, the embodiments of the present invention provide a self-service method and device applicable to a shopping mall provided with a plurality of shelves and a plurality of shopping carts. Specifically, each of the shelves is provided with a camera. The shopping carts are respectively pre-provided with different electronic tags. Different electronic tags correspond to different IDs. The method includes: acquiring, by the camera of each of the shelves, video data associated with the shopping cart at a distance from the shelf less than a preset value; determining, based on identification of the video data, whether an article is being placed into the shopping cart; if it is determined that an article is being placed into the shopping cart, acquiring the ID of the shopping cart, determining the placed article, and associating the ID with the article; displaying to a user a total sum of all articles associated with the ID, when detecting the shopping cart corresponding to the ID is located in a preset payment area of the shopping mall; and executing a permitting procedure for allowing the shopping cart corresponding to the ID to pass, upon reception of a message fed back from the payment area and indicating that the total sum corresponding to the ID has been cleared. Self-service shopping, realized by providing such cameras and electronic tags, is simple and easy to implement, widely applicable, less resource-consuming and thus can be applied to areas such as a relatively big shopping mall.

A person skilled in the art can understand that the drawings are merely schematic diagrams of a preferred implementation scenario, and the modules or procedures in the drawings are not necessarily required when implementing embodiments of the present invention.

A person skilled in the art can understand that modules in a device of an implementation scenario may be distributed in the device of the implementation scenario according to the description of the implementation scenario, and may also be distributed in one or more devices in a way different from the present implementation scenario, after subjecting corresponding changes. The modules in the abovementioned implementation scenarios may be combined into one module, and may be further divided into multiple sub-modules.

The above serial number of the implementation scenarios of the present invention is merely for the purpose of description and does not represent the preference of the implementation scenarios.

The above disclosure is just several specific implementation scenarios of the present invention. However, the present invention is not limited thereto, and any changes that may occur to a person skilled in the art should fall within the scope of protection of the present invention.

The invention claimed is:
1. A computer-implemented method, comprising:
  in response to a shopping cart being within a preset distance from a shelf, acquiring video data associated with the shopping cart;
  determining, based on the video data, an article being placed into the shopping cart;
  determining one or more product types associated with the shelf at a present period of time;

retrieving pre-stored images of the one or more product types;

identifying a product type of the article based on a two-stage matching procedure, comprising (1) performing a first matching procedure between an image of the article and the pre-stored images of the one or more product types associated with the shelf at the present period of time; and (2) in response to a nonmatch at the first matching procedure, performing a second matching procedure between the image of the article and pre-stored images of all product types;

acquiring an ID of the shopping cart;

associating the ID of the shopping cart with the product type of the article;

in response to the shopping cart being in a payment area, displaying to a user the product type of the article based on the ID of the shopping cart; and executing a permitting procedure for allowing the shopping cart to pass the payment area based on a payment of the article.

2. The method according to claim 1, further comprising:
acquiring the ID of the shopping cart from an electronic tag reader associated with the shelf.

3. The method according to claim 1, further comprising:
capturing the image of the article from the video data.

4. The method according to claim 1, further comprising:
capturing the image of the article directly from the article.

5. The method according to claim 1, further comprising:
in response to another nonmatch in the second matching procedure, generating a prompt message to prompt the user to make payment in an alternative method.

6. A system, comprising:
a camera configured to acquire, in response to a shopping cart being within a preset distance from a shelf, video data associated with the shopping cart;

a determining module configured to determine, based on the video data, an article being placed into the shopping cart;

an associating module configured to identify a product type of the article based on a two-stage matching procedure, comprising (1) performing a first matching procedure between an image of the article and pre-stored images of one or more product types associated with the shelf at a present period of time; and (2) in response to a nonmatch at the first matching procedure, performing a second matching procedure between the image of the article and pre-stored images of all product types;

a displaying module configured to display, in response to the shopping cart being in a payment area, to a user the product type of the article; and an executing module configured to execute a permitting procedure for allowing the shopping cart to pass the payment area based on a payment of the article.

7. The system according to claim 6, wherein
the associating module is further configured to
acquire an ID of the shopping cart via an electronic tag reader.

8. The system according to claim 6, wherein the camera is further configured to
shoot the article to capture the image of the article.

9. The system according to claim 6, wherein the camera is further configured to capture the image of the article from the video data.

10. The system according to claim 6, further comprising:
a prompting module configured to generate a prompt message to prompt the user to make payment in an alternative method.

11. A non-transitory computer-readable medium storing a program causing a computer to execute a process, the process comprising:

in response to a shopping cart being within a preset distance from a shelf, acquiring video data associated with the shopping cart;

determining, based on the video data, an article being placed into the shopping cart;

capturing an image of the article from the video data;

determining one or more product types associated with the shelf at a present period of time;

retrieving pre-stored images of the one or more product types;

identifying a product type of the article based on a two-stage matching procedure, comprising (1) performing a first matching procedure between the image of the article and the pre-stored images of the one or more product types associated with the shelf at the present period of time; and (2) in response to a nonmatch at the first matching procedure, performing a second matching procedure between the image of the article and pre-stored images of all product types;

acquiring an ID of the shopping cart;

associating the ID of the shopping cart with the product type of the article;

in response to the shopping cart being in a payment area, displaying to a user the product type of the article based on the ID of the shopping cart; and enabling, based on the product type of the article, the user to make a payment of the article.

12. The medium according to claim 11, the process further comprising:
executing a permitting procedure for allowing the shopping cart to leave the payment area based on the payment of the article.

* * * * *